US009558682B2

(12) United States Patent
Dreisbach et al.

(10) Patent No.: US 9,558,682 B2
(45) Date of Patent: Jan. 31, 2017

(54) TAMPER EVIDENT SECURITY SEAL

(71) Applicant: E.J. Brooks Company, Angola, IN (US)

(72) Inventors: Richard Dreisbach, Lafayette, NJ (US); Robert Debrody, Wayne, NJ (US); Michael Baker, Totowa, NJ (US); Carlos Pinho, North Arlington, NJ (US)

(73) Assignee: E.J. Brooks Company, Angola, IN (US)

( * ) Notice: Subject to any disclaimer, the term of this patent is extended or adjusted under 35 U.S.C. 154(b) by 348 days.

(21) Appl. No.: 13/755,017

(22) Filed: Jan. 31, 2013

(65) Prior Publication Data
US 2013/0200637 A1   Aug. 8, 2013

Related U.S. Application Data

(60) Provisional application No. 61/594,418, filed on Feb. 3, 2012.

(51) Int. Cl.
*B65D 27/30* (2006.01)
*B65D 33/34* (2006.01)
(Continued)

(52) U.S. Cl.
CPC ........... *G09F 3/0352* (2013.01); *F16G 11/106* (2013.01); *F16G 11/108* (2013.01); *F16G 11/14* (2013.01); *Y10T 292/502* (2015.04)

(58) Field of Classification Search
CPC .. Y10T 24/3976; Y10T 292/50; G09F 3/0352; F16G 11/106; F16G 11/108; F16G 11/14
(Continued)

(56) References Cited

U.S. PATENT DOCUMENTS

| 23,894 | A | * | 5/1859 | Bentley et al. | ................ 114/199 |
| 700,412 | A | * | 5/1902 | Fischer | ........................... 279/75 |

(Continued)

FOREIGN PATENT DOCUMENTS

| CN | 2426035 | 4/2001 |
| CN | 2683934 | 3/2005 |

(Continued)

OTHER PUBLICATIONS

State Intellectual Property Office Chinese Search Report, Chinese Application No. 201380018858.4, dated Sep. 1, 2015.

*Primary Examiner* — Kristina Fulton
*Assistant Examiner* — Faria Ahmad
(74) *Attorney, Agent, or Firm* — Gardner, Linn, Burkhart & Flory, LLP

(57) ABSTRACT

A seal housing body, extruded AL or molded plastic or metal, has cavity portions communicating through an interface region formed by one at least one frangible projection protruding from the first body into the cavity, a first cavity portion for receiving a locking body, the second cavity portion forming a shackle receiving passageway. The locking body has a channel inclined relative to and in communication with the passageway. A spring in the channel urges a shackle locking ball up the channel partially into the interface region, the ball, having a diameter sufficient to pass through the passageway, is captured in the channel by the at least one projection. The locking body has indicia and/or flanges, at one or both opposing ends, to provide tampering evidence. The channel is offset from the locking body's central plane forming a single channel side wall to preclude trapping the ball by tampering.

19 Claims, 13 Drawing Sheets

(51) Int. Cl.
  *B65D 55/06*  (2006.01)
  *G09F 3/03*  (2006.01)
  *F16G 11/10*  (2006.01)
  *F16G 11/14*  (2006.01)

(58) Field of Classification Search
  USPC .............................. 292/323, 307 R, 327, 252
  See application file for complete search history.

(56) References Cited

U.S. PATENT DOCUMENTS

| | | | |
|---|---|---|---|
| 830,565 A | 9/1906 | Brown | |
| 875,121 A * | 12/1907 | Shryock | 24/136 A |
| 918,570 A | 4/1909 | Mather | |
| 1,136,595 A | 5/1915 | Starr | |
| 1,139,595 A * | 5/1915 | Starr | 24/136 A |
| 1,271,912 A * | 7/1918 | Kemper | 403/384 |
| 1,471,034 A * | 10/1923 | Jordan, Jr. | 24/136 A |
| 1,490,451 A * | 4/1924 | Brown | 294/86.31 |
| 1,518,523 A * | 12/1924 | Kubik | 24/136 A |
| 1,577,678 A | 3/1926 | Behrman | |
| 1,606,873 A * | 11/1926 | Gamache et al. | 24/136 A |
| 1,829,760 A * | 11/1931 | Santiago | 294/86.22 |
| 1,832,388 A * | 11/1931 | Heisser | 24/136 A |
| 2,033,227 A * | 3/1936 | Brown | 173/129 |
| 2,062,628 A * | 12/1936 | Yannetta | 403/365 |
| 2,072,269 A * | 3/1937 | Mackin | 160/178.2 |
| 2,148,590 A * | 2/1939 | Tamarin | 188/65.1 |
| 2,346,477 A * | 4/1944 | Ederer | 152/221 |
| 2,349,114 A * | 5/1944 | Russell | 24/136 A |
| 2,412,097 A * | 12/1946 | Russell | 24/136 A |
| 2,599,700 A * | 6/1952 | Di Palma | 292/319 |
| 2,938,755 A | 5/1960 | James et al. | |
| 2,988,391 A * | 6/1961 | Erke | 292/325 |
| 3,591,223 A * | 7/1971 | Castro Neto | 292/260 |
| 3,770,307 A * | 11/1973 | Van Gompel | 292/307 R |
| 3,984,081 A | 10/1976 | Hoganson | 251/6 |
| 3,994,521 A * | 11/1976 | Van Gompel | 292/319 |
| 4,049,303 A * | 9/1977 | Irwin et al. | 292/307 R |
| 4,057,982 A | 11/1977 | Drayton | |
| 4,074,916 A * | 2/1978 | Schindler | 292/307 R |
| 4,141,117 A * | 2/1979 | Van Gompel | 24/136 R |
| 4,216,568 A * | 8/1980 | Anderson | 24/136 A |
| 4,280,726 A * | 7/1981 | McCoag | 292/327 |
| 4,342,477 A * | 8/1982 | McClure | 292/307 R |
| 4,358,944 A * | 11/1982 | Stoffel | 70/457 |
| 4,416,478 A * | 11/1983 | Canney | 292/307 R |
| 4,500,124 A | 2/1985 | Swift | |
| 4,640,538 A | 2/1987 | Brammall | |
| 4,681,356 A * | 7/1987 | Brammall | 292/327 |
| 4,747,631 A * | 5/1988 | Loynes | F16G 11/04 |
| | | | 24/136 A |
| 4,775,175 A * | 10/1988 | Swift | 292/307 R |
| 4,793,644 A * | 12/1988 | Swift | 292/320 |
| 4,883,295 A * | 11/1989 | Kesselman | E05B 67/365 |
| | | | 292/307 R |
| 4,893,853 A * | 1/1990 | Guiler | 292/320 |
| 5,092,641 A * | 3/1992 | Penick, Jr. | 292/307 R |
| 5,127,687 A | 7/1992 | Guiler | |
| 5,147,145 A * | 9/1992 | Facey et al. | 403/314 |
| 5,170,537 A | 12/1992 | Sperling | |
| 5,222,776 A | 6/1993 | Georgopoulos et al. | |
| 5,306,054 A * | 4/1994 | Georgopoulos | 292/307 R |
| 5,352,003 A | 10/1994 | Bystry | |
| 5,359,870 A * | 11/1994 | Reutlinger | 70/456 R |
| 5,538,300 A | 7/1996 | Brown | |
| 5,582,447 A * | 12/1996 | Leon et al. | 292/307 R |
| 5,611,583 A * | 3/1997 | Bystry et al. | 292/307 R |
| 5,647,620 A | 7/1997 | Kuenzel | |
| 5,743,574 A * | 4/1998 | Kohn | 292/315 |
| 5,820,176 A | 10/1998 | Leon et al. | |
| 6,089,056 A | 7/2000 | Yoda et al. | |
| 6,131,969 A * | 10/2000 | Natkins | 292/323 |
| 6,155,617 A * | 12/2000 | Kuenzel | 292/318 |
| 6,199,413 B1 | 3/2001 | McDaid et al. | |
| 6,345,847 B1 | 2/2002 | Dreisbach et al. | |
| 6,457,754 B1 * | 10/2002 | Bystry | F16G 11/04 |
| | | | 292/307 R |
| 6,494,508 B1 * | 12/2002 | Dreisbach et al. | 292/307 R |
| 6,540,273 B2 * | 4/2003 | Brammall et al. | 292/315 |
| 6,550,830 B2 * | 4/2003 | Kueznel | 292/327 |
| 6,578,886 B1 * | 6/2003 | Bystry et al. | 292/307 R |
| 6,581,292 B2 | 6/2003 | Allis | |
| 6,719,335 B2 * | 4/2004 | Velschou et al. | 292/307 R |
| D498,131 S | 11/2004 | Peacock et al. | |
| 7,073,358 B1 | 7/2006 | Lee | |
| 7,073,828 B2 * | 7/2006 | Foigel et al. | 292/315 |
| D537,317 S | 2/2007 | Jackson, Jr. | |
| D548,041 S | 8/2007 | Littrell et al. | |
| D553,575 S | 10/2007 | Littrell et al. | |
| 7,278,665 B2 * | 10/2007 | Rogatnev | 292/307 R |
| D557,105 S | 12/2007 | Lu | |
| D563,765 S | 3/2008 | Littrell et al. | |
| D564,338 S | 3/2008 | Lu | |
| D568,716 S | 5/2008 | Littrell et al. | |
| 7,472,933 B2 * | 1/2009 | Weedon et al. | 292/307 A |
| 7,478,847 B2 * | 1/2009 | Kleynerman et al. | 292/323 |
| 7,641,062 B2 * | 1/2010 | Arakawa | 211/117 |
| 2006/0117816 A1 | 6/2006 | Lee | |
| 2011/0012377 A1 | 1/2011 | Simes et al. | |
| 2013/0200637 A1 * | 8/2013 | Dreisbach et al. | 292/323 |

FOREIGN PATENT DOCUMENTS

| | | |
|---|---|---|
| DE | 20314436 U1 | 11/2003 |
| EP | 1967759 A1 | 9/2008 |
| WO | WO 9318316 A1 * 9/1993 | ............. F16G 11/04 |
| WO | PCT/US13/023990 | 1/2013 |

* cited by examiner

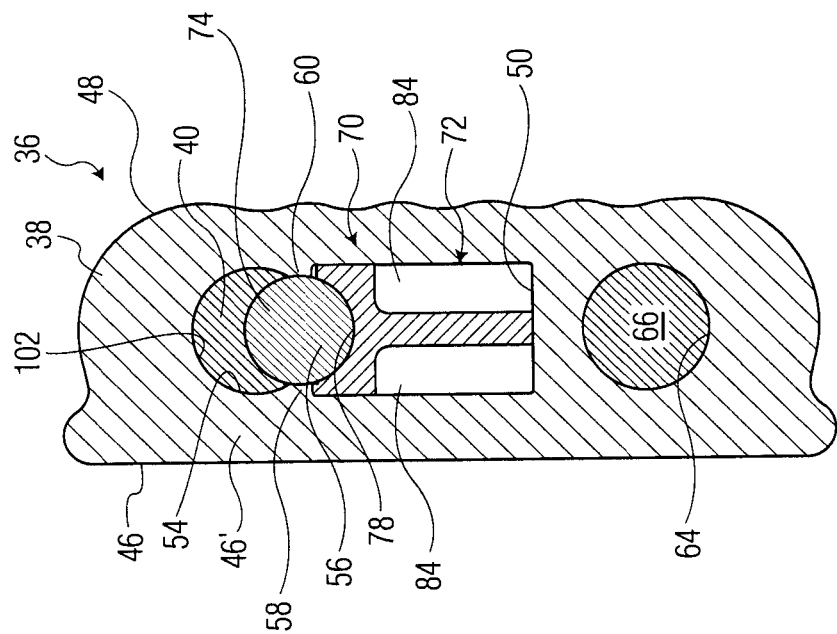
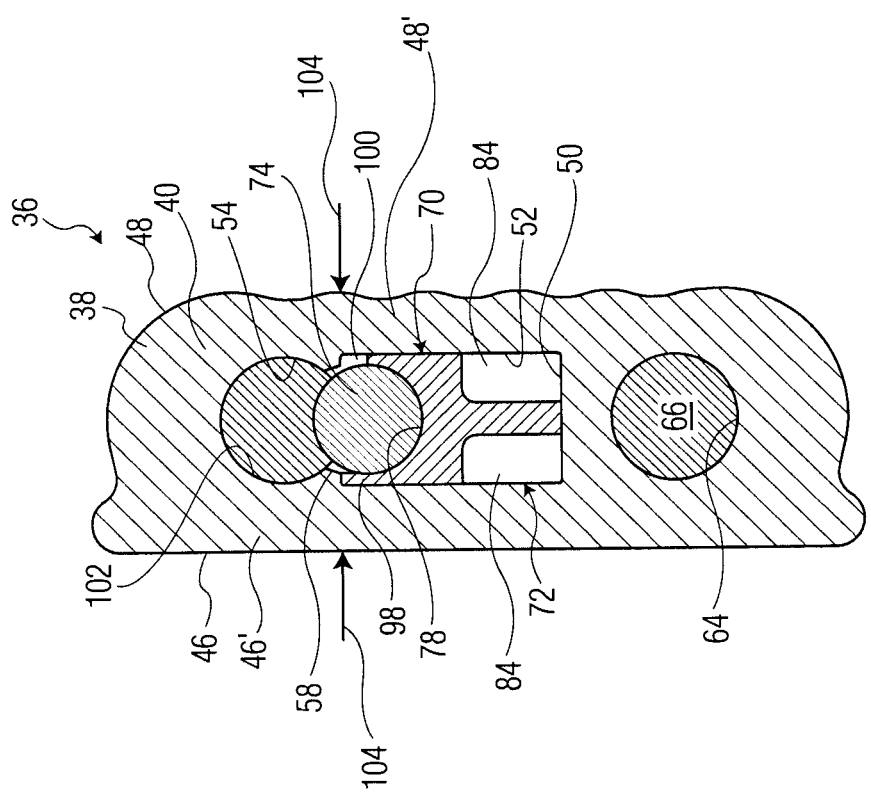

TAMPER EVIDENT SECURITY SEAL

Priority is claimed on U.S. provisional application Ser. No. 61/594,418 filed Feb. 3, 2012 and incorporated herein by reference in its entirety.

This invention relates to improved cost effectiveness and improved tampering evidence features in tamper evident security seals.

Tamper evident security seals have numerous sizes, shapes and elements that differ in many different ways from each other. Many such seals may be metal, plastic or combination of different materials. The present invention relates particularly to a seal with a stranded metal cable shackle, but may also relate to seals having shackles of different materials. More, particularly, the present invention relates to security seals that are all metal, or a combination of metal and plastic or all plastic or other materials.

Size is important for all seals as to material costs, especially metal seals, as metal is relatively costly. Reducing the size of the seal system to reduce the amount of material used provides an effective cost saving. Relatively small size metal seals are known, but these are also believed relatively costly for mass marketing due to high volumes involved.

U.S. Pat. No. 5,538,300 ('300) to Brown, illustrates a cable lock and seal device. The seal comprises a housing body having a cavity into which a locking body is inserted. The locking body forms a passage with the cavity for receiving the cable one end. The cable other end is fixed to the first body. A roller, for example, a disc with serrated edges and a central groove encircling the roller's periphery, is disclosed. The locking body has an inclined ramp on which the roller moves up and down toward and away from the cable receiving passage. The roller moves between a retracted position and a locking position. The roller moves to the retracted position in a direction away from the passage. In this position, the cable can be drawn through the passage in an insertion direction. In the locking position, the roller moves toward the passage. In this position, the roller rolls up the ramp to clamp the cable against movement in a cable withdrawal direction. This action traps the cable between the roller and the opposite face of the passage. A spring urges the roller toward the passage to frictionally engage the cable. The roller periphery is grooved to enhance the gripping of the cable.

FIGS. 1-5 herein illustrate a seal similar to that in the aforementioned '300 patent. In FIGS. 1-3, a seal 2 has an outer housing body 4 and a locking body 6. The housing body has a cavity 8 in which the locking body 6 is fixedly positioned. The cavity 8 has three portions, two of which forming cable 14 receiving passages 10 and 12 and a central portion 13 receiving the locking body 6. The cable 14 has one end 16 that is fixed, e.g., staked, to the housing body 4 within the passage 10. The cable other end 18 is received by passage 12 in direction 20 to secure an article, e.g. a hasp, etc.

The locking body 6, FIG. 5, has a ramp 22 that is inclined relative to the passage 12 longitudinal axis 11 and the coinciding longitudinal axis 19 of the cable end 18 received in passage 12. A spring 24 is in communication with the ramp 22. A roller 26 rolls on the ramp 22 and is urged up the ramp by the spring generally to a shackle locking position in a direction opposite to direction 20, but inclined thereto. The roller 26, FIG. 3, has a grooved periphery 28 and a pair of hubs 30 (FIG. 4). In FIG. 4, the cable diameter is about one half of the diameter d of the roller 26. Thus the roller 26 is much larger than the cable, e.g., twice its diameter. This larger diameter relationship of the roller to the cable diameter is true also in the '300 patent. Because of this relatively larger roller size, the roller 26 can not completely enter the passage 12 and fall out of the seal housing when the roller 26 and the locking body 6 are in the seal housing cavity, FIGS. 1 and 2. The locking body 6 being fixed to the body 4, e.g., staked to outer body 4, also fixes the roller in the position shown inside the cavity 8 in communication with the passage 12.

When the cable end 18 is inserted into the passage 12 to a locking mode, it engages the roller 26 causing the roller to retract down the ramp 22 against the spring 24 force. This also retracts the spring, which now is urging the roller up the ramp against the inserted end 18 of the cable to a cable locking position. As in the '300 patent, when the cable is withdrawn in a direction opposite to the insertion direction 20, the cable friction engagement with the roller causes the roller to roll upward to clamp the cable against the face of the passage 12 opposite the roller in a cable locking position. This wedges the cable between the roller 26 and the passage 12 wall of the locking body 4, locking the cable to the outer housing body 4.

The prior art seals of FIGS. 1-5 and the '300 patent have several problems. A first problem is that the roller with the hubs as shown in the '300 patent and FIGS. 1-5 has peripheral grooves. This roller has to be machined as shown. Such machining is costly. Also, because the roller is larger in diameter than the cable diameter, it uses more material than desired and adds to its cost. A more important second problem is that the seal 2 can be tampered with to cause an unauthorized release of the cable 14.

After theft of the contents of the protected area, the seal is restored to its original state in a manner that is not readily evident upon inspection. This release of the cable is accomplished by squeezing the body 4 side walls 34 in the directions of arrows 32, FIG. 2, such as by pliers and the like. This action pushes the side walls 34 inwardly against the roller hubs 30. This reduces the width of the cavity 8 trapping the roller 26 so it can not move up the ramp to its locking position to provide the designed increased locking action when the cable is withdrawn. Thus the cable can be easily withdrawn and the seal opened. When a thief is finished stealing the contents of the secured area, the cable is then reinserted into the passage 12 such that evidence that the seal has been opened is not visible. This is not desirable.

A further problem is that the locking body 6 may be hammered out of the seal outer housing body 4 cavity 8 by applying sufficient force to the locking body 6. This releases the cable. When the thief is finished, the body 6 is reinserted into the cavity 8, and evidence of tampering is not present. This is not desirable.

Of interest are the following commonly owned US patents related to security seals employing rollers and inclined ramps. U.S. Pat. Nos. 6,345,847, 5,820,176 and 5,222,776 each disclose a seal and lock mechanism employing two balls of different sizes associated with a ramp for locking a cable in one embodiment and a single ball with a ramp in a second embodiment. In both embodiments, the balls are larger than the cable and thus have the problem at least of relatively high material cost. The larger balls require a more robust seal housing body which further adds to the cost. The seal housing bodies of such robust seals are larger than that of the FIG. 1 and '300 patent seal bodies and exhibit higher cost due to the added material employed. Further, no locking body is used in these latter structures, so the design of the seal is different than the FIG. 1 and '300 patent seals, which are closer in size and configuration to the seal of the present invention.

U.S. Pat. No. 4,640,538 exhibits a seal having two rollers with machined grooves on their outer peripheral surface, also costly in this respect. This seal is different than the FIG. 1 and '300 patent seals and also is different than the seal of the present invention.

A further problem is that there is an international standard for testing the stranded metal cable seals known as ISO 17712. This standard requires a ⅛ inch (3.175 mm) diameter stranded metal cable seal to be looped around two ½ inch diameter rods and pulled apart to hold 2250 lbs. (10 KN). See FIG. 1a.

In FIG. 1a, for example, seal 110 is tested under ISO 17712. Two rigid steel rods 114 and 116 are employed in a test apparatus (not shown). The rods are pulled apart in directions 118, 120, direction 118 being the insertion direction of the cable free end 115. The other cable end 122 is permanently staked in a housing passageway in a conventional manner to the seal 110 housing. The force required to break the ⅛ inch (3.175 mm) diameter stranded metal cable 112 or fail the seal 110 is recorded. The cable 112 is wrapped about the rod 116 and locked to the seal 110 in the seal cable insertion passageway in a conventional cable locking mode.

The seal 110 is on one side of the rod 114 and the cable is wrapped about the other rod 116 so that the cable and seal form a loop wrapped about the two rods at region 113. The cable exits the seal 110 from the same seal end 111. The problem with this seal is that the test stresses the cable 112 by bending the cable about 90° in region 113, FIG. 1a. The cable is stressed such that one or two cable strands initially break instead of all of the strands as a unit. This one or two strand breaking action reduces the cable strength by about 30%. Tests show that the strength of the cable is undesirably reduced by about 400 lbs (181 kg) per strand.

U.S. Pat. Nos. 5,352,003 to Bystry, 6,457,754 to Bystry et al. and 7,278,665 to Rogatnev disclose seals that do not address the above noted problems.

The present inventors recognize a need to solve the above problems with the relatively more costly cable seals, the reduced strength of the ⅛ inch diameter stranded metal cable seal, and to provide a lower cost and more effective tamper evident seal. The present inventors recognize a need for a seal having the benefits of an all metal seal that is more difficult to defeat than a non-metal seal, and, importantly, for providing significant evidence of tampering missing in the prior art seals and at the same time provide a lower cost seal configuration that reduces the amount of required material for mass production purposes.

They further recognize a need for a metal stranded cable seal that meets or exceeds the ISO standard. All of the aforementioned seals are mass produced in large quantities such that added material costs for the larger more robust seals and additional machining costs are a commercially important factor to provide a competitive low cost and yet, a more reliable tamper evident seal.

A need is seen for a lower cost tamper evident cable seal, and importantly, which, at the same time, provides effective evidence of tampering. Evidence of tampering is important, as certain trusted persons may be tempted to steal valuables protected by such seals. If a person can break open the seal, take the forbidden property, and then reattach the seal without the seal having evidence that it has been broken into, then this presents a problem to the owner by making it more difficult or impossible to identify the person(s) responsible for the theft.

The theft may only be able to be detected later in time and at some other location when an authorized person first opens the seal and examines the contents of the sealed region. In this case, the trusted person can not be readily blamed as it is not known where in transit the theft occurred. If the theft is detected at the trusted person's location, then the search for the thief is narrower due to the limited number of people who have access to the sealed contents.

A tamper evident security seal according to an embodiment of the present invention comprises a housing body, a cavity in the body has a first portion forming a shackle passageway defining a longitudinal axis. A second cavity portion is in communication with the first portion through an interface region between the first and second cavity portions. A locking body is in the cavity second portion, the locking body having a channel in communication with the passageway through the interface region and forming a ramp inclined relative to the longitudinal axis. A rolling shackle engaging element in the channel is captured in the cavity second portion by the interface region. A spring is coupled to the locking body for urging the shackle engaging element up the ramp toward the interface region to a shackle locking position causing a portion of the shackle engaging element to protrude through the interface region into the passageway to a shackle engaging state. Included is a flexible elongated shackle having opposing ends, one shackle end for being positioned in the passageway engaged with the shackle engaging element in a shackle insertion direction along the longitudinal axis, the insertion of the shackle retracting the shackle engaging element down the ramp away from the interface region, the rolling locking element being arranged for frictionally engaging the shackle causing the element to displace up the ramp to a shackle locking position during shackle withdrawal to lock the engaged shackle to the housing body.

In one embodiment, the locking body has opposing ends, at least one of the ends is arranged for indicating damage thereto inflicted by an applied force tending to displace the locking body relative to the housing body to thereby indicate tampering.

In a further embodiment, the locking body has opposing ends, at least one of said ends having an outwardly extending flange overlying the housing body to preclude the displacement of the locking body within the first body cavity in a direction towards the other opposing end.

In a further embodiment, the cavity second portion is blind so that the locking body can only be inserted into the cavity second portion in one direction from the ambient atmosphere.

In a further embodiment, the housing body is one of extruded aluminum having a uniform cross section throughout the housing body in the direction of the longitudinal axis or molded.

In a further embodiment, the housing body is one of molded plastic or metal and wherein the cavity second portion is blind and thus communicating with the ambient atmosphere around the housing body at only one location such that the locking body is in communication with the housing body exterior surface only at the one location.

In a further embodiment, the channel is offset from the center of the locking body in a direction between and normal to its side walls such that the channel is defined by substantially only one of the locking body side walls to thereby preclude the trapping of the rolling locking element on the ramp by squeezing the housing body inwardly against the locking body at the rolling locking element.

In a further embodiment, the shackle has a diameter, the rolling locking element has a diameter no greater in diameter than the shackle, and preferably smaller in diameter, the ball having a surface roughness sufficiently great to frictionally grip and lock the shackle in the locking position In a further embodiment, the housing body and the locking body are molded plastic.

In a further embodiment, the interface region is defined by at least one projection protruding from the housing body into the cavity for the capturing of the rolling locking element.

In a still further embodiment, the interface region is defined by at least one projection protruding into the cavity from the housing body, the at least one projection being sufficiently frangible such that a withdrawal force on the shackle of a given magnitude causes the element to deform the at least one projection to permit the element to completely enter the passageway.

In a still further embodiment, the second portion of the cavity is blind so as to be in communication with the ambient atmosphere around the housing body substantially at only one surface of the housing body. A locking body is in the cavity second portion having only one end in communication with the ambient atmosphere outside of the cavity.

In a still further embodiment, the housing body includes structure between the first cavity portion and the passageway forming an interface region for capturing a ball or other rolling locking element in the cavity second portion.

In a still further embodiment, the one end of the locking body is arranged to be damaged in response to an applied force to remove the locking body from the cavity to provide evidence of tampering.

In a still further embodiment, the locking body has opposing ends, at least one of which ends has at least one of raised or depressed indicia and/or an outwardly extending flange for overlying the housing body and manifesting damage inflicted by an applied force tending to displace the locking body relative to the housing body and thereby indicate tampering.

In a still further embodiment, a flexible elongated shackle has opposing ends, one end being fixedly secured to the housing body at and extending from a housing body first end, the shackle other end for insertion into the passageway at a housing body opposite second end for engagement with the locking element in a shackle insertion direction that displaces the element down the ramp to an element retracted position, the locking element being arranged for frictionally engaging the engaged shackle, the shackle for causing the frictionally engaged locking element to displace up the ramp to lock the engaged shackle to the housing body in a locking position during withdrawal of the shackle from the passageway out of the housing body cavity at the housing body second end.

In a still further embodiment, a shackle locking ball in the channel has a diameter sufficiently small to pass through the shackle passageway.

In a still further embodiment, the locking ball has a surface roughness arranged for frictionally engaging the engaged shackle.

IN THE DRAWING

FIG. 11a is a side elevation view of the locking body showing the side shown in FIG. 9, wherein the end shown on the right in FIG. 9 is on the left in FIG. 11a;

Figure 1:
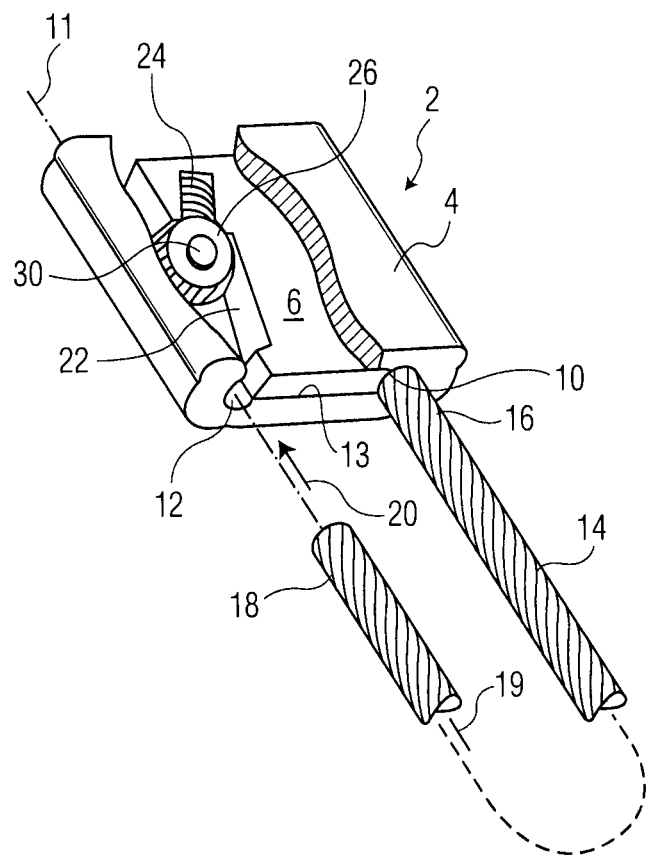
FIG. 1 is an isometric top cutaway view of a security seal in the unlocked state with a flexible elongated shackle cable (partially shown in dashed lines) attached according to one embodiment of a prior art seal.
Figure 1A:
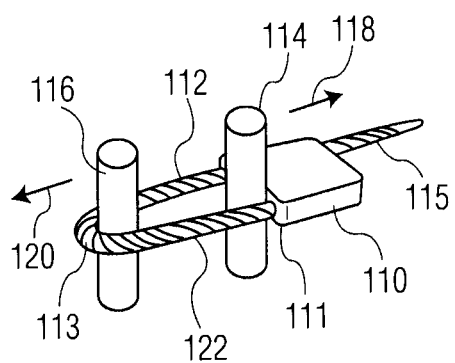
FIG. 1a is an isometric view of a test arrangement for testing a security seal to ISO 17712 standard.
Figure 17:
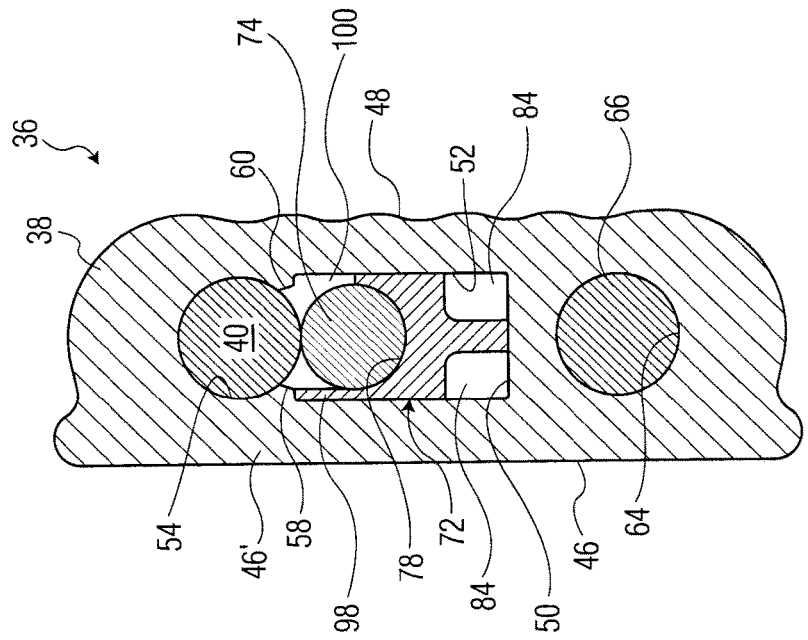
FIG. 17 is an is an end elevation cross section view similar to the view of FIG. 16, showing the shackle during insertion into the seal shackle passageway showing the rolling shackle engaging ball partially retracted from the position of FIG. 15.
Figure 20:
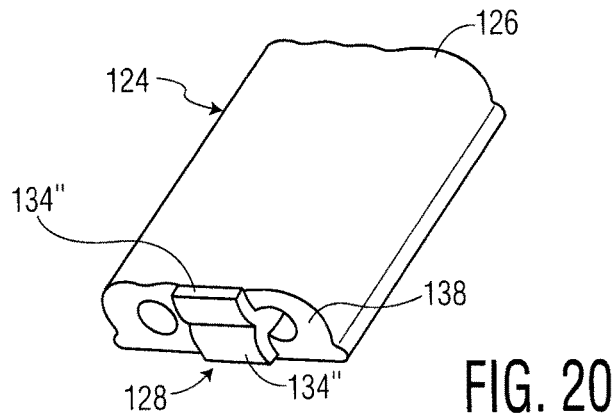
Figure 21:
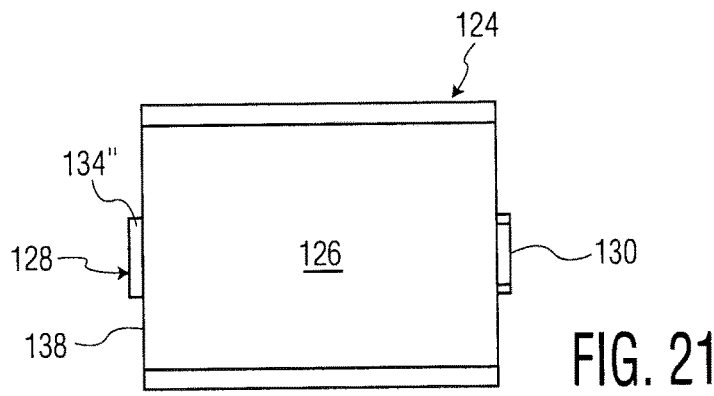
Figure 22A:
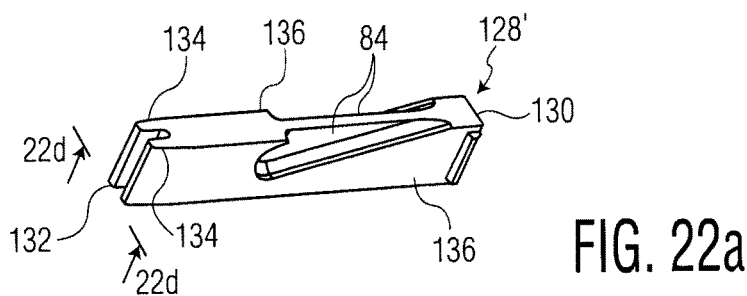
Figure 22B:
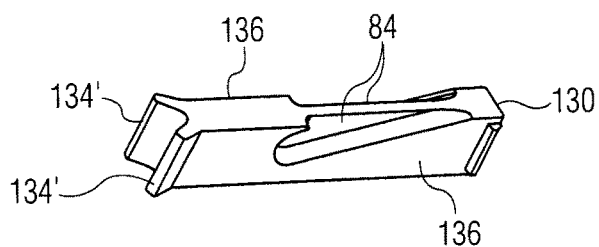
Figure 22C:
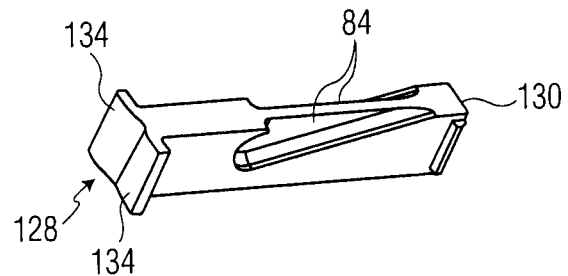
Figure 22D:
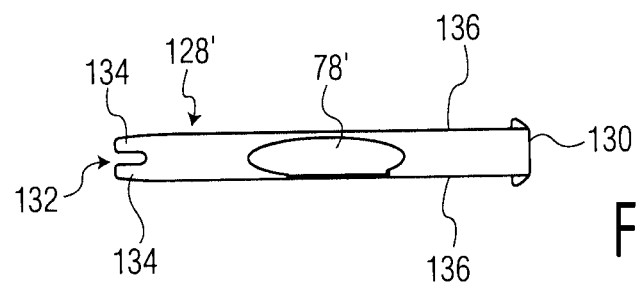
Figure 23:
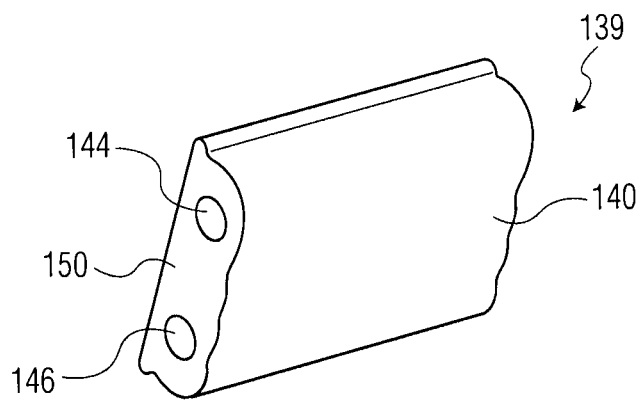
Figure 24:
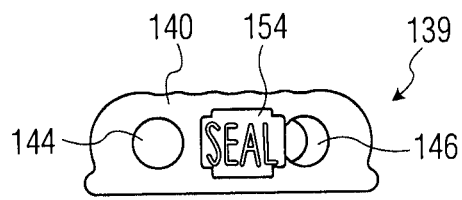
Figure 25:
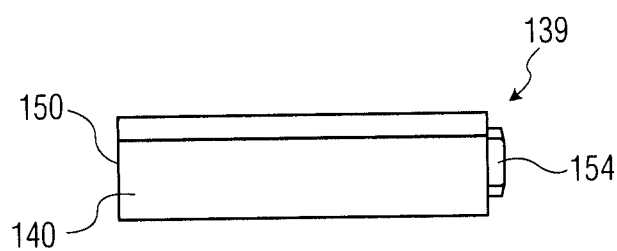
Figure 26:
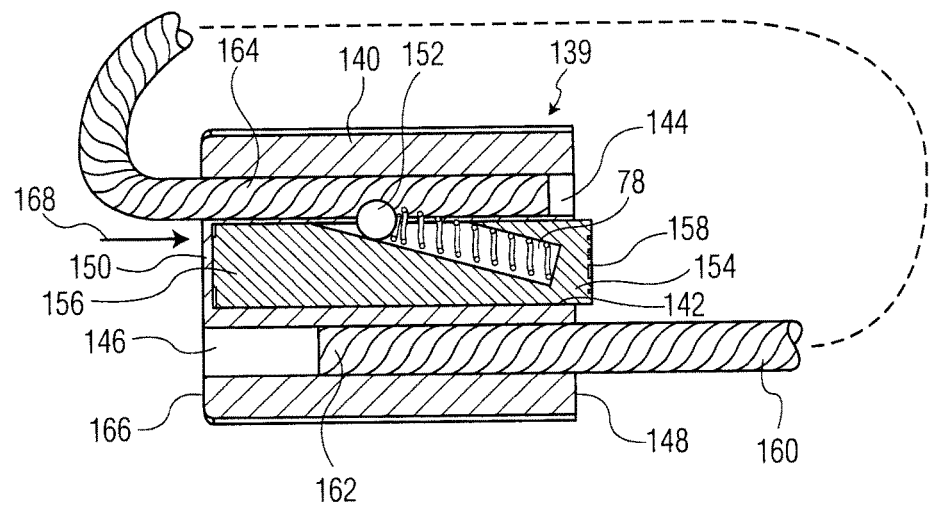
Figure 27:
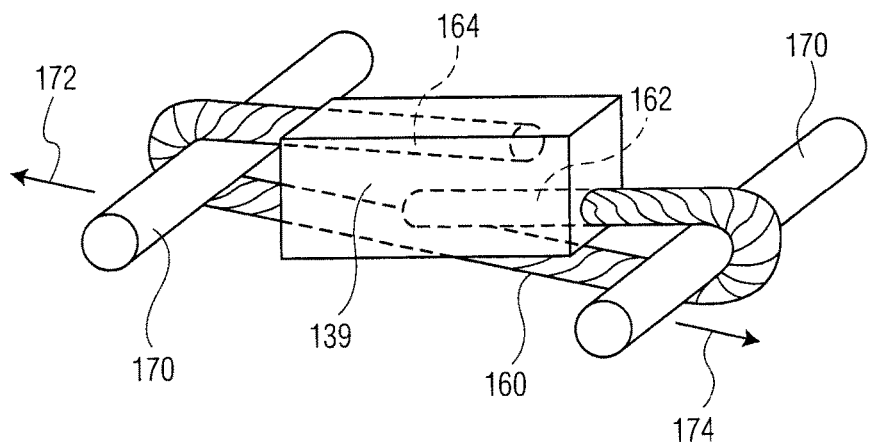

FIG. 18 is an is an end elevation cross section view similar to the view of FIG. 17, showing the shackle after insertion into the seal shackle passageway showing the rolling shackle engaging ball in the shackle locked state; and FIG. 19 is an is an end elevation cross section view similar to the view of FIG. 18, showing the shackle in a withdrawn position from the locked state of FIG. 18 illustrating the shackle locking ball broken through a pair of ridges that normally capture the ball in the locking body channel, with the ball diameter being smaller than the shackle passageway diameter and the shackle diameter;

FIG. 20 is an isometric top-front view of a seal showing a locking body according to a further embodiment of the present invention;

FIG. 21 is a top plan view of the seal of FIG. 20;

FIGS. 22a, 22b, 22c are isometric bottom-front views of the locking body of the embodiment of FIGS. 20 and 21 illustrating various successive stages of formation of the locking body;

FIG. 22d is a top plan view of the locking body of FIG. 22a taken along lines 22d-22d of FIG. 22a;

FIG. 23 is a rear-side isometric view of a seal according to a further embodiment of the present invention without the shackle attached, the locking body not being visible in this view as it is within a blind seal locking body cavity;

FIG. 24 is a rear end elevation view of the seals of FIGS. 20, 21 and 23 showing the locking body end opposite to the end shown in FIG. 20, with the tamper indicating indicia "seal" depressed into the locking body end surface;

FIG. 25 is a side elevation view of the seal of FIG. 23 showing the tamper indicating portion at the rear of the housing body also shown in FIG. 24;

FIG. 26 is a side elevation sectional view of the seal of FIG. 23 with a cable shackle attached (a portion of the cable being shown in dashed lines); and FIG. 27 is an isometric view of a test apparatus similar to the apparatus of FIG. 1a testing the seal of FIG. 26.

Figure 6:
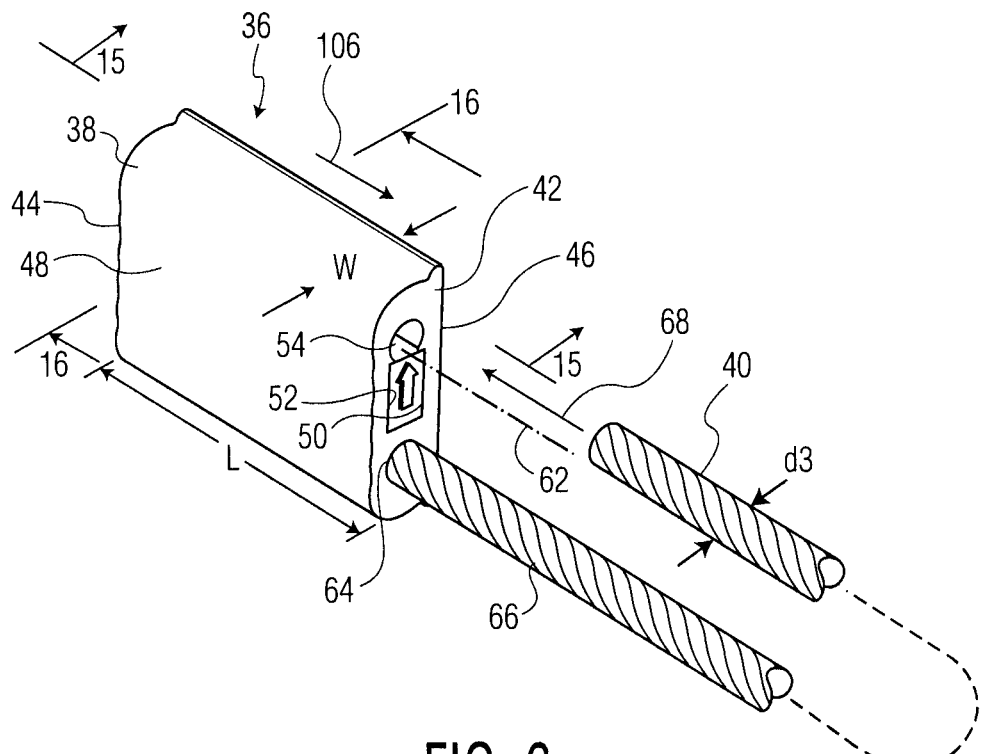
FIG. 6 is an isometric view of the seal according to one embodiment of the present invention including a flexible elongated shackle partially shown in dashed lines, preferably a steel stranded cable in this embodiment, and a locking body (only the end of which is shown)
Figure 7:
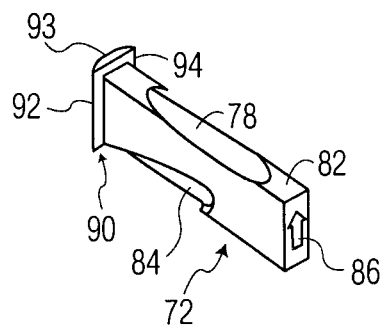
FIG. 7 is an isometric top-side-end view of the locking body of the seal of FIG. 6 showing one end of the locking body with a raised arrow indicia on that end.

Seal 36, FIG. 6, according to one embodiment of the present invention, comprises a seal housing outer shell body 38, preferably of extruded aluminum, which may also be cast zinc or molded plastic, or steel or other materials, to which is attached one end 66 of a shackle 40, preferably a stranded steel cable of about ⅛ inches in diameter d3 (3.175 mm). Other seal bodies may be provided for use with steel stranded cables, or cables or shackles of different materials, e.g., plastic, of different diameters, e.g., 1/16 inch, ¼ inch and so on. Also cables or shackles of plastic or other materials, solid or stranded, may also be used in other embodiments depending upon a given implementation. The housing body 38 has two opposing ends 42 and 44 comprising parallel planar surfaces. The body 38 has two opposing sides 46 and 48, the side 46 being planar and the side 48 optionally undulating. The body 38 is generally rectangular with a length L, a width w and a height h. The height h may be about 0.9 inches (22.86 mm), the length may be about 1.25 inches (31.75 mm) and the width may be about 0.240 inches (6.1 mm). Other dimensions may be applied to the various elements according to a given implementation.

Figure 8:
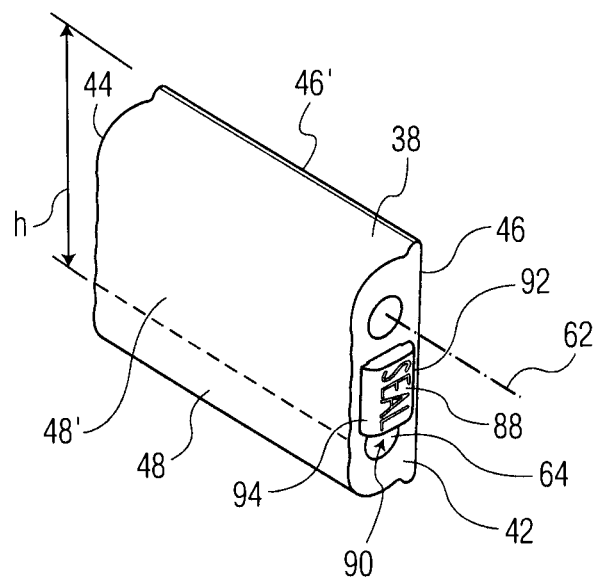
FIG. 8 is an isometric view of the end of the seal body the same as FIG. 6 but with no shackle shown and with the locking body inserted in a direction opposite to that of FIG. 6 illustrating the locking body end opposite to that of FIG. 6 wherein the is inserted into the passageway at the far end of the seal body opposite to the shackle insertion direction of the seal of FIG. 6.
Figure 9:
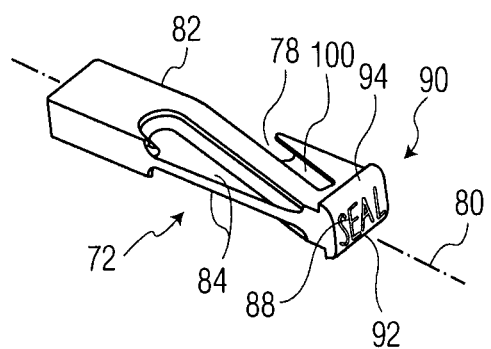
FIG. 9 is an isometric bottom, end and side view of the locking body of FIG. 7 showing the locking body end similar to that in FIG. 8 opposite to its orientation in FIGS. 6 and 7, showing the locking body side opposite to the side shown in FIG. 7.
Figure 10:
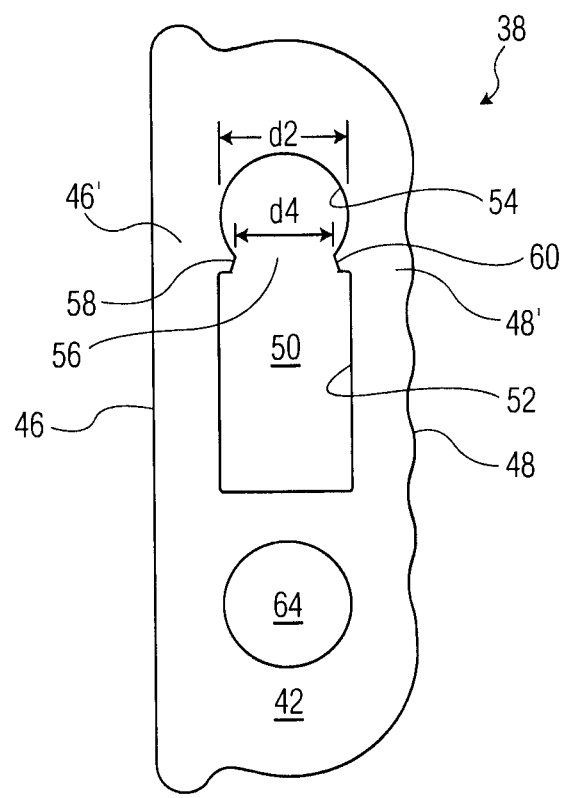
FIG. 10 is an end view of the seal body, without the cable, opposite the end of the seal body shown in FIGS. 6 and 8.

In FIG. 10, the housing body 38 has a cavity 50 that extends through the body 38 in uniform cross section in communication with the opposing ends 44, 46 (FIG. 6). The cavity 50 has a first portion 52 and a second portion 54. The first portion 52 is generally rectangular in end cross section view notwithstanding it is in communication with portion 54. The second portion 54, which forms a shackle passageway for receiving a shackle such as a stranded metal cable and the like, is generally circular cylindrical notwithstanding it is in communication with portion 52. Portions 52 and 54 are in communication with each other through interface region 56. Region 56 is defined by a pair of spaced apart facing mirror image projections which in this embodiment comprise a pair of mirror image ridges 58, 60 protruding from the respective side walls 46', 48', at corresponding sides 46, 48 extending for the length L of the body 38, since the body 38 is extruded. In the alternative, in a molded or cast body such as body 38, the projections may take any shape and may comprise at least one projection protruding from at least one housing body side wall into the cavity. The at least one projection captures a locking element primarily in the cavity portion 50 discussed in more detail below. The second shackle passageway portion 54 of the cavity 50 has a longitudinal axis 62, FIGS. 6 and 8, and is adapted to receive a free end of the shackle 40, FIG. 6.

Figure 10A:
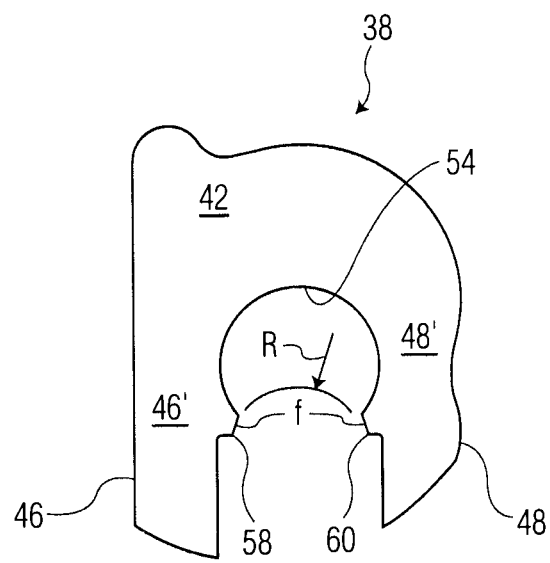
FIG. 10a is an enlarged end view of a portion of the seal body of FIG. 10 showing the interface region of the cavity in more detail.

In FIGS. 10 and 10a, the ridges 58 and 60 define an interface region 56 across the distance d4 (FIG. 10). Distance d4 is preferably about 0.11 inches (2.794 mm). The faces f of the ridges 58, 60, FIG. 10a, are curved and preferably lie on a common circle having a radius R. In this embodiment, the radius R is about 0.063 inches (1.6 mm), which defines a diameter of about ⅛ inches (3.175 mm), about the same as the diameter of the shackle 40. The faces f receive and engage a roller locking ball (FIG. 16) which forms a rolling shackle engaging element, to be described. The cavity portion 54 has a diameter in this embodiment of preferably about 0.147 inches (3.73 mm). The shackle 40 (FIG. 6) free end is inserted into the cavity portion 54 and closely received therein in a locking mode.

In FIG. 10, circular cylindrical through bore 64, forms a shackle passageway, and is in communication with the opposing body ends 42, 44 (FIG. 6) parallel to the cavity 50. Bore 64 closely receives the end 66 of the shackle 40, FIGS. 6 and 15. The shackle end 66 is permanently attached to the body 38 by staking (a common process) involving local deformation of the housing body 38 to place it in locking engagement with the shackle 40 end 66, FIG. 6 (not shown).

Figure 15:
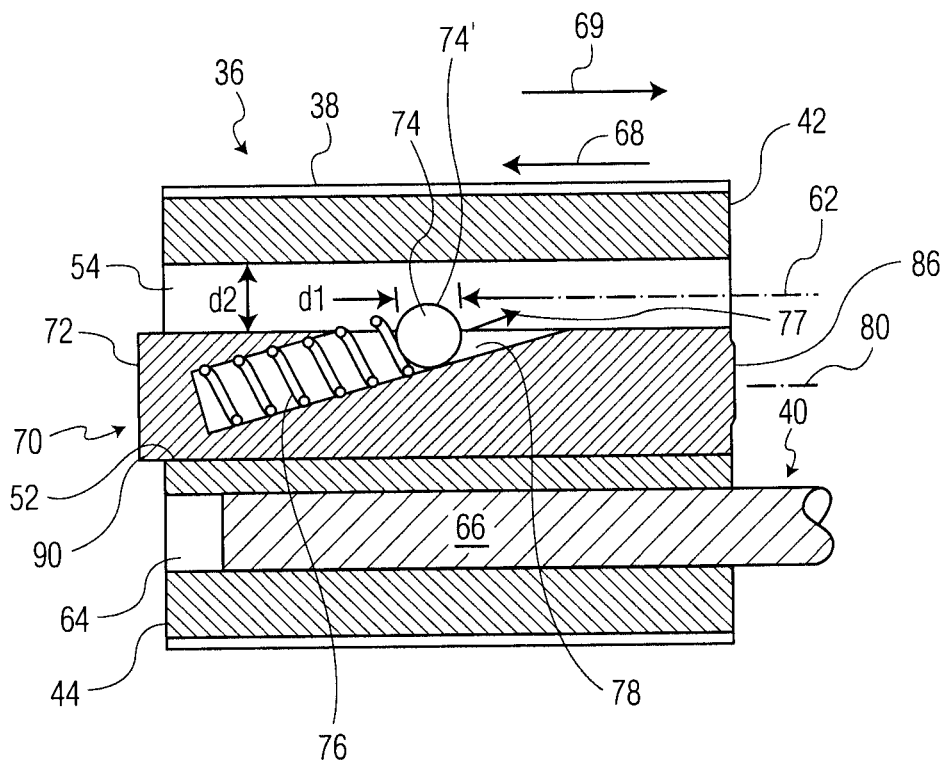
FIG. 15 is a sectional elevation view of the seal of FIG. 6 taken along lines 15-15.

The cavity portion 52 of the seal housing body 38 contains a locking unit 70, FIG. 15, for locking the shackle inserted into the cavity portion 54 passageway in insertion direction 68. The locking unit 70 in this embodiment includes an insert locking body 72, a preferably a ⅛ inch (3.175 mm) diameter (distance d1, FIG. 15) preferably steel ball 74 similar to a ball bearing, and a coiled metal spring 76. The insert locking body 72 is staked to the seal body 38 (not shown). The staking of the shackle 40 and the insert locking body 72 of the locking unit to the seal body 38 is by conventional known techniques.

A typical locking ball in the prior art corresponding to ball 74 is a ball bearing. As commercially available, such a ball has a very smooth outer surface. This smooth outer surface performs adequately to lock the cable to the seal. However, Applicants have discovered that such a smooth outer surface on the locking ball permits tampering. An excess force can withdraw the cable from its locked state. To counter this effect, the ball outer surface in accordance with an embodiment of the present invention is provided with a roughened outer surface to enhance its tamper resistance. This roughened surface preferably comprises random pitting as provided by shot peen, sand blasting and similar processes. Roughing the surface by scratching with grit paper is not as effective for such tampering resistance. There are a number of ways to provide a roughened surface, per Table I.

TABLE I

| | METHOD | RMS μinch |
|---|---|---|
| SPI (Society of the Plastic Industry) | | |
| A-1 | Grade #3 Diamond Buff | 0.5-1.0 |
| A-2 | Grade #6 Diamond Buff | |
| A-3 | Grade #15 Diamond Buff | 1.0-2.0 |
| B-1 | 600 Grit Paper | |

TABLE I-continued

| | METHOD | RMS μinch |
|---|---|---|
| B-2 | 400 Grit Paper | |
| B-3 | 320 Grit Paper | 7.0-7.5 |
| C-1 | 600 Stone | |
| C-1 | 400 Stone | |
| C-1 | 320 Stone | |
| SPE (Society of Plastic Engineers) #3 SPI | 280 Stone | 12.0-15.0 |
| D-1 | Dry Blast Glass Bead #11 | |
| D-2 | Dry Blast #240 Oxide | 26.0-32.0 |
| D-3 | Dry Blast #24 Oxide | 160.0-190.0 |
| D-1* | 600 Stone prior to Dry Blast Glass Bead #11 | |
| D-2* | 400 Stone prior to Dry Blast #24 Oxide | |
| D-3 * | 320 Stone prior to Dry Blast #24 oxide | |

Finishes D-2, D-3 and D-2* are preferred to provide the desired minimum roughness values to enhance providing tamper evidence. A rougher finish on the ball would also be acceptable. The other smoother finishes are believed to be not as effective to preclude tampering but may be acceptable according to a given implementation. A finer finish, e.g., A-1, 2, 3, B-1 to 0-3, is believed to result in the ball or roller not gripping the shackle sufficiently to provide the desired tamper evidence.

Figure 16:
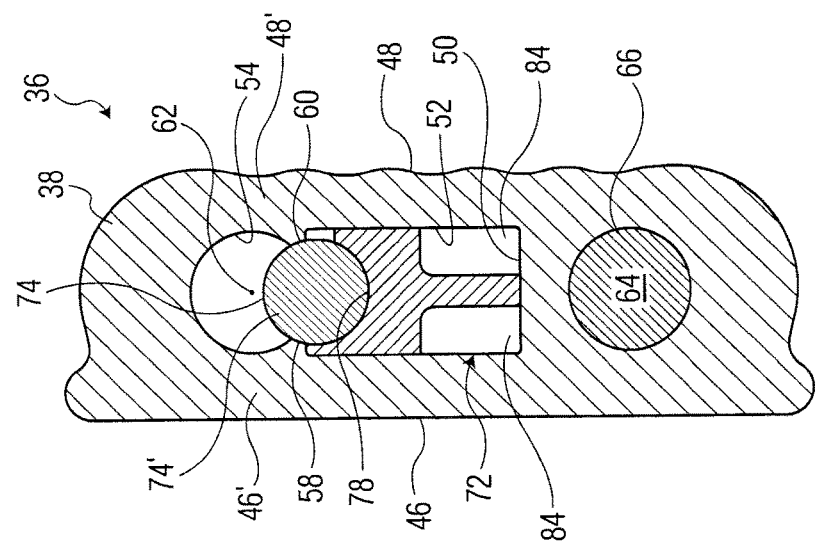
FIG. 16 is an end elevation cross section view of the seal of FIG. 6 taken along lines 16-16.

The locking body 72 of the locking unit 70, FIGS. 7, 9, 11a-11d, 12-14, in this embodiment, is elongated and rectangular in elevation end view cross section, preferably cast heat treated zinc, closely received in the cavity portion 52, FIG. 16. In the alternative, the insert locking body 72 may be molded plastic or other materials. The body 72 as a circular cylindrical channel 78. The channel is preferably about 0.127 inches in diameter (3.22 mm) inclined relative to the body longitudinal axis 80 and forming a locking roller ball element ramp. The channel 78 is in communication with the top surface 82 of the body 72. The ball 74 is closely, and freely, received in the channel, which serves as an up-down ramp for the ball. The spring 76, is located in the channel 78 for normally urging the ball up the ramp toward the cavity portion 54 shackle passageway, FIG. 15, direction 77, in a quiescent position.

The locking body 72 has a pair of spaced apart recesses 84 at the bottom portion of the body to minimize the amount of material forming the body minimizing cost. One end of the body 72 has indicia 86 formed by a raised arrow upstanding from the body end surface. The other opposite end of the body 72 has indicia 88 in the form of a word "SEAL" imprinted as depressed grooves in the end surface. On the same end as indicia 88, the body 72 has a flanged member 90 on which the indicia 88 is imprinted. The member 90 has flanges 92, and 94 extending outwardly from the body 72 normal to the longitudinal axis 80 and which flanges overlie the adjacent housing body 38 surface (FIG. 8) at end 42. The flanges 92 and 94, and the indicia 86 and 88 are important to preclude tampering in a manner to be explained.

Figure 11A:
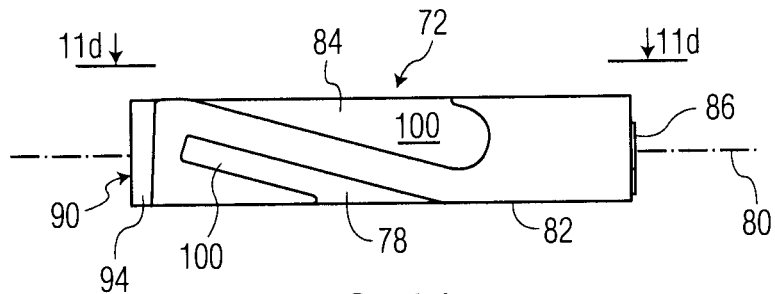
Figure 11B:
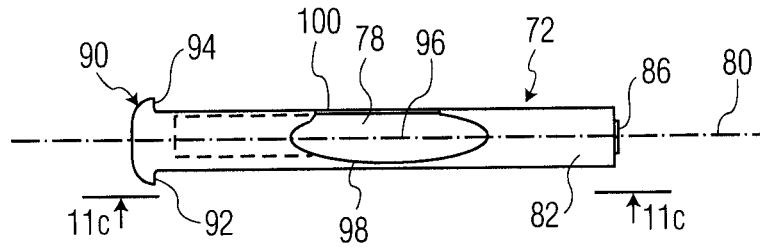
FIG. 11b is a top plan view of the locking body of FIG. 11c taken in along lines 11b-11b.
Figure 11C:
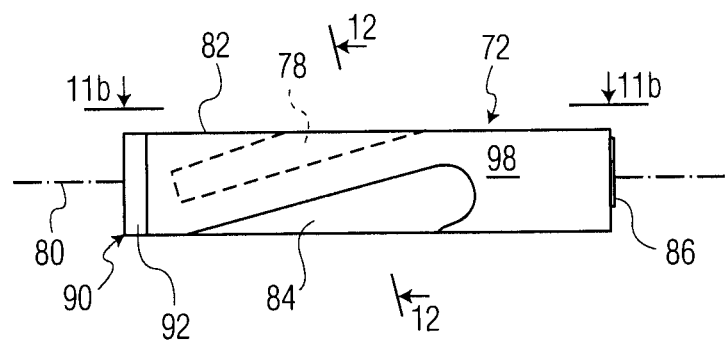
FIG. 11c is a side elevation view of the locking body of FIG. 11b taken in directions 11c-11c.
Figure 11D:
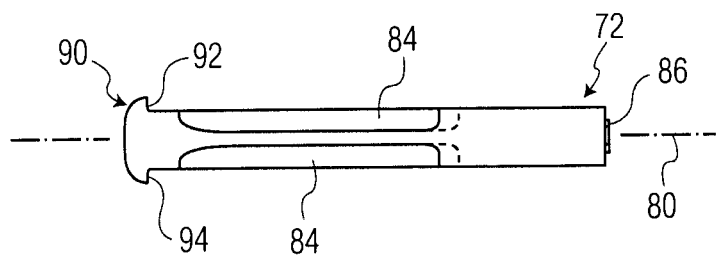
FIG. 11d is a bottom plan view of the locking body of FIG. 11a taken along lines 11d-11d.
Figure 12:
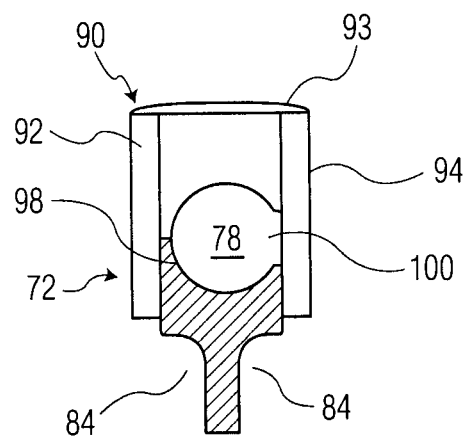
FIG. 12 is an end sectional view of the locking body of FIG. 11c taken along lines 12-12.
Figure 13:
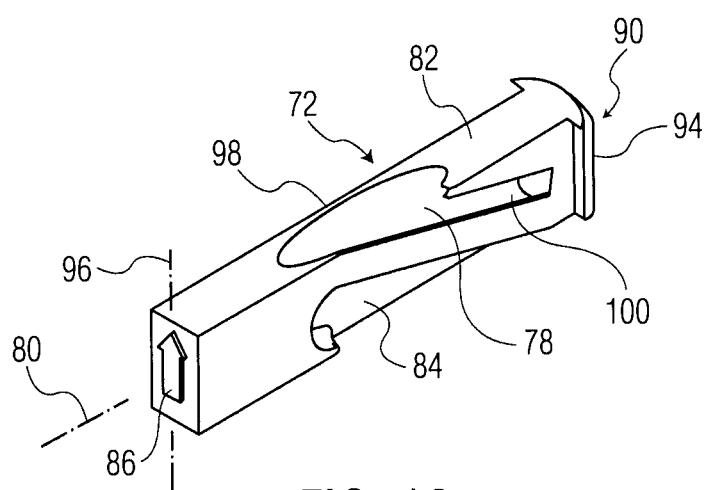
FIG. 13 is an isometric top-side-end view of the locking body similar to the view of FIG. 7, but taken on the side of the locking body opposite to the side shown in FIG. 7.
Figure 14:
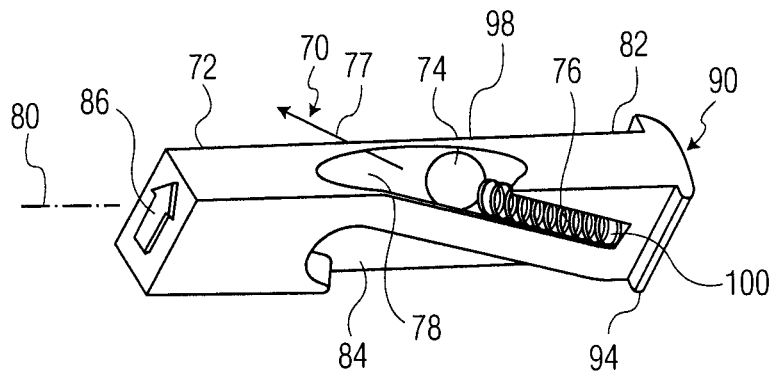
FIG. 14 is an isometric top-side-end view of the locking body similar to the view of FIG. 13 showing the rolling locking ball element and its spring in the corresponding channel.

As best seen in FIGS. 11b, 13 and 14, the locking body 72 has a central plane 96. The channel 78 is offset with respect to that plane 96. Consequently, the channel 78 ha one side wall 98 and the other side on the opposite side of the plane 80 and body 72 is open at region 100, with no side wall, FIGS. 12, 13 and 14. This offset relation of the channel 78 and the absence of a side wall in region 100 is important to preclude tampering also in a manner to be explained.

The ball 74, FIG. 16, diameter d1 (FIG. 15) is greater than the interface region 56, FIG. 10, distance d4 between the ridges 58, 60. The ridges 58, 60 have curved faces (radius R, FIG. 10a) that substantially match the curvature of the ball 74 outer surface for engaging and capturing the ball 74 within the channel 78. This limits the distance the ball 74 can travel up the ramp of the channel 78m permitting the ball to only partially protrude into the cavity portion 54, FIG. 15. The spring 76 urges the ball against the ridges 58, 60, direction 77, FIG. 15.

However, the distance d4 between the ridges 58, 60 is sufficiently wide to permit a portion 74' of the ball 74 to enter into the cavity portion 54 shackle passageway, FIGS. 15 and 16. The portion 74' of the ball protrudes into the cavity portion 54, FIG. 16, while captured, an amount to compress, frictionally engage and lock the flexible resilient shackle 40 to the outer shell housing body 38. This action clamps the shackle 40 against the interior wall surface 102 of the cavity portion 54 shackle passageway opposite the ball, FIG. 18. In the clamped shackle locking state, FIG. 18, the ball depresses the shackle 40 somewhat as shown due to the shackle resiliency. In this state, the ball 74 need not engage the ridges 58, 60 to sufficiently lock the shackle 40 to the body 36. The ball-shackle engagement keeps the shackle 40 from being withdrawn from the cavity portion 54. The roughened ball surface assists in this shackle gripping action.

In FIGS. 15 and 16, the seal 36 is in its quiescent state with the end 66 of the shackle 40 staked to the bore 64 in the seal body 38. The insert locking body 72 of the locking unit 70 is staked fixed to the seal body 38 in cavity portion 52. In this state, the shackle 40 is not yet inserted into the cavity portion 54. The ball 74 is urged against the ridges 58, 60 protruding into the cavity portion 54.

In operation, in FIG. 17, the shackle 40 end is inserted into the cavity portion 54 passageway. As the shackle is inserted direction 68, FIG. 15, it pushes the ball 74 down the ramp of the channel 78 into a retracted state out of the way of the shackle as it is inserted. In the inserted position, the ball 74 is frictionally engaged with the shackle 40. The shackle 40 is then forcibly displaced in a withdrawal direction 69, FIG. 15, somewhat to the position of FIG. 18 so that the ball 74 compresses the shackle 40. This compression occurs as the ball 74, being frictionally engaged with the shackle 40, is dragged up the ramp of the channel 78 by the shackle as the shackle moves in the withdrawal direction 69, FIG. 15. The more the shackle is withdrawn, the more the ball rises up the ramp of the channel 78 due to the ball's friction engagement with the shackle, compressing the shackle further and locking it to the seal body 38, FIG. 18. The ball 74 is sufficiently inside the cavity portion 54 passageway to provide maximum locking action forcing the shackle 40 against the side of the cavity portion 54 of the housing body 38 while still being captured by the ridges 58, 60. As shown in FIG. 18, the ball 74 need not abut the ridges 58, 60 to lock the shackle to the seal body 38.

Tampering Evidence

As to tampering with the seal 36 to open it without leaving evidence of such tampering, the seal 36 has a number of provisions to provide evidence of such tampering that is unique to this seal. Such evidence provides a deterrence to tampering with the seal in an attempt to open it.

Figure 2:
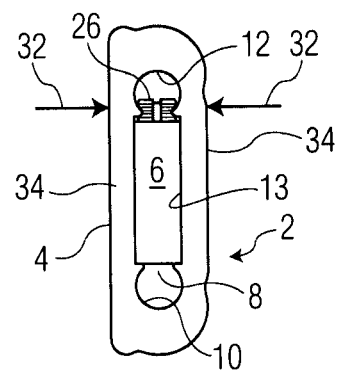
FIG. 2 is an end view of the seal of FIG. 1 without the cable.
Figure 3:
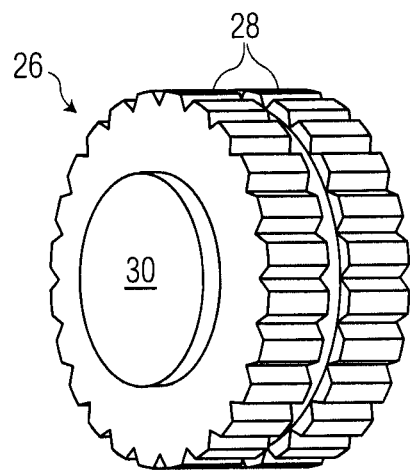
FIG. 3 is an isometric view of the roller of FIGS. 1 and 2.
Figure 4:
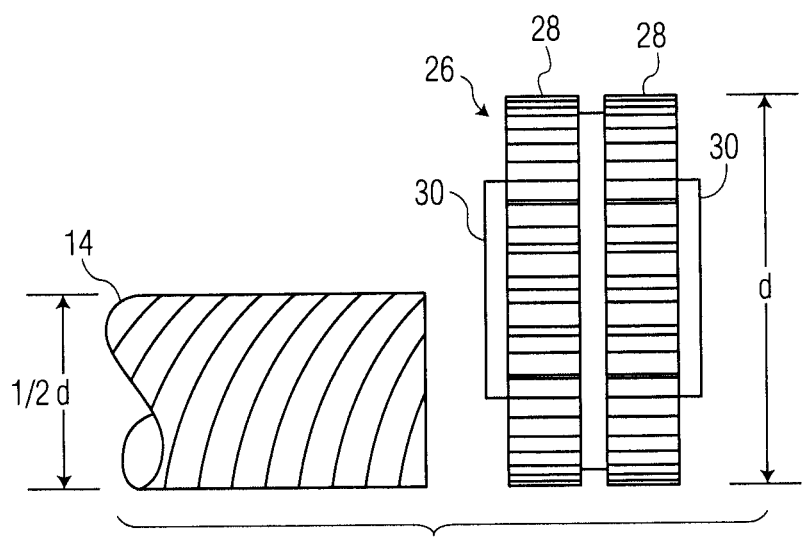
FIG. 4 is a side elevation view of the roller of FIG. 3 and of a portion of the cable illustrating certain relationship between the two.
Figure 5:
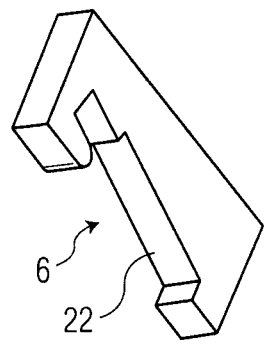
FIG. 5 is an isometric view of an locking body used in the embodiment of FIGS. 1 and 2.

1. A first kind of tampering is the squeezing of the seal body 38 to lock the ball so it can not jam against the shackle and clamp further against the shackle as the shackle is withdrawn. In FIG. 18, for example, a tool, such as pliers and the like, not shown, are used to squeeze the seal body 38 side walls 46', 48' inwardly toward each other, in the direction of arrows 104. In the prior art such as shown in FIG. 2, when the seal body walls are squeezed in the direction of arrows 32, the body side walls clamp the hubs 30 of the roller 26. This locks the roller 26 so that withdrawal of the shackle does not drag the roller with it up the ramp into a further clamped mode. With the roller 26 thus locked, a sufficient force on the shackle permits it to be withdrawn. After theft occurs, the shackle is reinserted into the seal body and there is no evidence of tampering (The jaws of the pliers may be prevented from marring the seal body surface with a suitable protective material).

In FIG. 18, the seal according to the embodiment of the present invention avoids this kind of tampering. In FIG. 18, the channel 78 of the insert locking body 72 has substantially only one side wall 98. The other side has a minimum side wall portion 101 at region 100. Compare portion 101 to side wall 98. Portion 101 is not effective to trap the ball by squeezing the housing body sides 46, 48 inwardly, arrows 104. This action is possible due to the channel 78 offset position in the insert locking body 72. Thus, in FIG. 18, the channel 78 has an open space 100 on one side and only one wall, 98 on the opposite side of the channel. When a force is exerted on the body 38 side walls 46', 48' these walls compress inwardly toward each other. However, wall 48' when compressed inwardly will not engage the ball 74 as there is a space between the ball and the wall 48'. The channel 78 has insufficient wall 101 between the ball 74 and the side wall 48' to provide a squeezing force on the ball in this position. In fact, the force on wall 48' might force the ball 74 further into the shackle locking the shackle further, defeating the attempt at tampering.

2. A second kind of tampering involves the forcible withdrawal of the shackle with high force. In this case, the ball is dragged further up the ramp of the channel 78. When a sufficiently high withdrawal force is exerted, the ball 74, FIG. 19, is forced through the interface region 56 of the ridges 58, 60, fracturing the ridges (or any other projection or projections that perform a similar capturing function of the ball 74). The ridges 58, 60 (are elongated along length L due to being extruded; when molded, the projection(s) may have any shape and number) are dimensioned to fracture in response to such an excessive withdrawal force to permanently show evidence of tampering. The dimensions of the ridges are determined empirically to permit fracturing according to a given implementation. The insert locking body 72 is sufficiently brittle to fracture in the presence of such forces. The seal body 38, for example in this embodiment, is preferably extruded Al 6063-15, which breaks at the ridges as described.

When the ridges 58, 60 break, the ball 74 then can completely pass through the interface region 56 into the cavity portion 54 passageway, FIG. 19. The ball being somewhat smaller in diameter than portion 54 of the cavity may then fall out of the cavity. However, if a withdrawal force on the shackle is so great as described, the outer housing body 38 may also break apart, the shackle may break or some combination thereof. If sufficient force is applied to the ball in this case, and the ball falls out of the cavity 54, the shackle and seal are unusable and there is visible evidence of tampering. The parts are cracked, broken and/or deformed.

3. A third kind of tampering is when the insert locking body 72, FIG. 1, is hammered or otherwise forced out of the cavity 8 by applying high forces on an end of the body 72, for example, in either of directions 68 or 69, FIG. 15. When so pushed, the body 72 is displaced in a direction such that the ball 74 is displaced in the downward direction along the ramp of the channel 78. The displacement of the ball 74 in this direction disengages the ball from the cable 40, permitting the seal to be opened.

In the present embodiment, the insert locking body 72 has a raised arrow indicia 86 on one end and the grooved impressed word "seal" indicia on the other end, FIGS. 8, 9, 13, 14. If a sufficient force is applied to these indicia to displace the body 72 out of the cavity portion 52, such a force will permanently damage these indicia. The indicia 86, as is the body 72, being of relatively deformable material, e.g., cast zinc, in response to local focused forces, will be permanently damaged by such forces tending to displace the body 72 out of the cavity portion 52. The other end word "seal" can also be damaged by such tampering forces. However, this other end has an additional provision for indicating tampering by forceful hammering displacement of the body 72 in direction 106, FIG. 6.

This other end of the insert locking body 72 has a flanged member 90, FIGS. 6-9, 11a-14, having flanges 92 and 94. These flanges abut, that is, they overlie, the end surface of end 44 of the body 38. The arrow end of the body 72 is at the opposite end 42 of the body 38, FIG. 6, without fracturing the flanges. In FIG. 15, the insert locking body 72 can not be pushed in direction 69 wherein the ball 74 could be pushed down the ramp of the channel 78 without such permanent fracturing. This would otherwise be an easy tampering since the ball would be pushed out of engagement with the shackle in this direction of tampering. The only way for the locking unit body 72 to be displaced in direction 69 would be to break the flanges 92 and 94. This breakage produces permanent damage to the insert locking body 72. Such permanent damage provides desirable evidence of tampering.

Displacement of the body 72 in a direction 68, FIG. 15, opposite to direction 69, forces the ball 74 up the ramp of channel 78 into greater clamping action with the shackle 40 and causes more serious permanent damage to the parts as noted above, not withstanding that the arrow indicia 86 on the end of the body 72 would also be damaged in response to such increased forces. Any attempt at tampering with the seal 36 according to the embodiment of the present invention results in tampering evidence. Such evidence tends to discourage such tampering and thus provide enhanced protection to the sealed goods In FIG. 20, a further embodiment of an insert locking body is illustrated. In this figure, seal 124 has an extruded aluminum outer housing body 126. The body 126 has the identical cavity 8 of the body 38 of the FIG. 6 embodiment. However, the insert locking body 128 is different. In FIG. 22c, the locking body 128 has a flanged end 130 the same as at end 42 of the body 38, FIG. 8. The locking body 128 has a channel 78' and recesses 84' which are the same as channel 78 and recesses 84 in the locking body 72, FIGS. 9, 13 and 14. the locking body 128 is formed as shown in FIGS. 22a, 22b, 22c and 22d. The body 128 is initially cast zinc in the form of body 128', FIGS. 22a and 22d. End 132 of the body 128' is formed with two spaced parallel tines 134 that extend from the body 128' parallel to the side surfaces 136 of the body 128'. In a next forming step, the tines 134 are then splayed outwardly into a U-shape, FIG. 22b, forming two splayed wings 134'. The wings 134' are then further bent to about right angles to the length dimension of the body 128 to form the flanges 134". The flanges 134" are formed after the locking body 128 is inserted into the housing body 126. The flanges 134" overlie the housing body 126 end surface 138.

In a further embodiment, in FIGS. 23-26, seal 139 has a housing body 140 that is either cast zinc, molded plastic or molded/cast other material. In FIG. 26, the body 140 has a blind cavity 142. Two parallel circular cylindrical shackle receiving bores 144 and 146 parallel to cavity 142 pass through the body 140 on respective upper and lower sides of the cavity 142. The blind cavity 142 is in communication with end 148 of the housing body 140. The cavity 142 terminates at and is blocked by wall 150 of the outer housing body at the other end of the housing body 140, FIGS. 23 and 26. An insert locking body 154 is in the cavity 142. The body 154 has a squared end surface at end 156 of the body 154 that fits snugly in the cavity 142. The insert locking body 154 has a flanged member 158 at the body end opposite end 156 the same as flanged member 90, FIG. 9. Otherwise the insert locking body 154 is identical to the body 72, FIG. 9.

The outer seal housing body 140 has one or more projections (not shown), e.g., ridges 58, 60, FIG. 10*a*, at the interface between cavities 142 and 144 similar to the projections in the embodiment of the seal 36, FIGS. 6 and 10*a*. These projections capture the rolling locking element ball 152 in the insert locking body channel 78, which is of the same configuration as the body 72, FIG. 9 etc., of the embodiment of the seal 36.

In this configuration, FIG. 26, the shackle 160 has one end 162 staked or otherwise fixed and secured to the body 140 in the lower bore 146. The shackle (shown partly in dashed lines) 160 at end 162 extends from the housing body 140 at one end 148 of the housing body 140. The locking body 154 is oriented in the outer housing body so that the shackle other end 164 can only be locked to the seal by insertion into the upper bore 144 at an end 166 of the housing body opposite end 148, direction 168. In this embodiment, the insert locking body 154 can not be pushed out of the blind cavity 142, in a direction that retracts the ball in the channel 78, due to the presence of wall 150 of the cavity. The insert locking body 154 also has the word "seal" impressed, FIG. 24, and flanges that overlie the seal outer housing body 140 end. The flanges provide additional tamper evidence if an attempt is made to remove the locking body in direction 168, FIG. 26. This direction of removal of the locking body 154 also forces the ball 152 up the ramp of the channel 78 further enhancing the locking action on the shackle.

The attachment of the shackle to opposite ends of the housing body 140 increases the breaking strength of the seal 139. This is verified with the ISO test per FIG. 27. In FIG. 27, test rods 170 are pulled in opposite directions 172, 174 by the test apparatus. This test shows that the seal 139 has higher strength that meets the test requirements of the international standard ISO 17712 for testing the stranded metal cable seals. This standard requires a ⅛ inch cable to be looped around the two rods ½ inch in diameter. The seal is required to hold 2250 lbs (10 KN). A seal, FIG. 26, tested according the requirements of this test show that this seal holds about 3000 lbs. whereas a seal according to the configuration of FIG. 6 holds about 2200 lbs., a 400 to 800 lb. increase in holding strength. This is a significant difference.

It will occur to those of ordinary skill that modifications may be made to the disclosed embodiments. For example, the disclosed bodies, the locking roller, the configuration and orientation of the various disclosed elements, their materials, dimensions, and overall configurations may differ from those disclosed herein. The various embodiments disclosed herein are given by way of illustration and not limitation. Such modifications are intended to be included in the scope of the present invention as defined by the appended claims.

What is claimed is:

1. A tamper evident security seal comprising:
a housing having a cavity;
a locking body in the housing cavity;
a flexible elongated shackle having opposing ends;
a shackle passageway in the housing and cavity for receiving a shackle end, the passageway defining a longitudinal axis;
the locking body having a further cavity in communication with the passageway through an interface region between the further cavity and the passageway;
the locking body further cavity comprising a channel forming a ramp inclined relative to the longitudinal axis;
a rolling shackle engaging element in the channel captured in the channel by the interface region;
a spring coupled to the locking body for urging the shackle engaging element up the ramp toward the interface region to a shackle locking position causing a portion of the shackle engaging element to protrude through the interface region into the passageway to a shackle engaging state;
wherein the passageway is configured to receive the shackle end in a shackle insertion direction along the longitudinal axis and contact the shackle engaging element, the insertion of the shackle retracting the shackle engaging element down the ramp away from the interface region, the shackle engaging element being arranged for frictionally engaging the shackle at the interface region;
wherein, when the shackle is withdrawn in a shackle withdrawal direction opposite the shackle insertion direction, the shackle engaging element is configured to move up the ramp to a shackle locking position to lock the engaged shackle to the housing body;
wherein the locking body includes sidewalls that extend along and define opposing sides of the channel, and wherein the sidewalls are substantially parallel to the longitudinal axis of the passageway, and wherein the locking body includes an aperture through one of the sidewalls to form an open space at the one of the sidewalls at least partially along the channel, and wherein the open space is located at the locking body adjacent to the channel and the rolling shackle engaging element to prevent inward pressure on sides of the housing adjacent the rolling shackle engaging element from inhibiting movement of the rolling shackle engaging element along the ramp of the channel; and
wherein the housing includes projections extending inward toward each other between the shackle passageway and the cavity, and wherein the projections are configured to deform or fracture upon forcibly withdrawing the shackle end in a shackle withdrawal direction opposite the shackle insertion direction.

2. The tamper evident security seal of claim 1, wherein the locking body has opposing ends, at least one of which ends is arranged for indicating damage thereto inflicted by an applied force tending to displace the locking body relative to the housing to thereby indicate tampering.

3. The tamper evident security seal of claim 1, wherein the housing has first and second ends and the locking body has opposing ends, at least one of the locking body ends having an outwardly extending flange overlying the housing first end to preclude the displacement of the locking body within the housing cavity in a direction towards the housing second end.

4. The tamper evident security seal of claim 1, wherein the locking body has opposing ends, at least one of which has a deformable feature comprising at least one of a raised or depressed indicia and an outwardly extending flange for overlying the housing, and wherein the deformable feature on at least one of the opposing ends of the locking body is configured to deform upon a force applied to the locking body that tends to displace the locking body from the housing, thereby manifesting damage inflicted by the applied force to indicate tampering to the connection of the elongated shackle with the shackle engaging element.

5. The tamper evident security seal of claim 1, wherein the housing is extruded aluminum having a uniform cross section throughout the housing—in the direction of the longitudinal axis.

6. The tamper evident security seal of claim 1, wherein the shackle has a diameter, the rolling shackle engaging element is no greater in diameter than the shackle, the shackle engaging element is a ball which has a surface roughness sufficiently great to frictionally grip and lock the shackle in the locking position.

7. The tamper evident security seal of claim 1, wherein the housing and the locking body are molded plastic.

8. The tamper evident security seal of claim 1, wherein the projections are disposed at the interface region between the cavity and the passageway for contacting and capturing of the rolling shackle engaging element as the rolling shackle engagement element moves along and up the ramp toward the shackle locking position as a result of the shackle being withdrawn from the housing.

9. The tamper evident security seal of claim 8, wherein the projections are sufficiently frangible such that a withdrawal force on the shackle of a given magnitude causes the element to deform the at least one projection to permit the shackle engaging element to completely enter the passageway.

10. The tamper evident security seal of claim 1, wherein the rolling shackle engaging element is a ball arranged to frictionally grip the shackle.

11. The tamper evident seal of claim 1, wherein the interface region is defined by at least one projection protruding into the space between the passageway and the further cavity for capturing the rolling shackle engaging element in the channel.

12. The tamper evident seal of claim 11, wherein the at least one projection is sufficiently frangible such that a withdrawal force on the shackle of a given magnitude causes the rolling shackle engaging element to deform the at least one projection to permit the shackle engaging element to completely enter the passageway.

13. The tamper evident seal of claim 1, wherein the interface region is defined by at least one frangible projection protruding into the space between the passageway and the further cavity, the at least one projection for capturing the rolling shackle engaging element to the further cavity, the at least one projection being sufficiently frangible such that a withdrawal force on the shackle of a given magnitude causes the rolling shackle engaging element to deform the at least one projection to permit the rolling shackle engaging element to completely enter the passageway.

14. A tamper evident security seal comprising:
a housing having a cavity;
a locking body in the cavity;
a shackle passageway defining a longitudinal axis and located in the housing and cavity;
the locking body having a channel in communication with the passageway forming a ramp inclined relative to the longitudinal axis;
a rolling shackle engaging element in the channel;
a spring coupled to the locking body for urging the shackle engaging element toward the passageway and to cause a portion of the shackle engaging element to protrude into the passageway;
a flexible elongated shackle having opposing ends, one of which opposing ends is for entering the passageway for engagement with the shackle engaging element in a shackle insertion direction that moves the shackle engaging element down the ramp away from the interface region to an element retracted position, wherein the shackle engaging element is configured to frictionally engaging the shackle upon inserting the shackle into the passageway, and wherein, when withdrawing the shackle from the passageway in a shackle withdrawal direction opposite the shackle insertion direction, the shackle engaging element is configured to move up the ramp to lock the engaged shackle to the housing body in a locking position;
wherein the locking body includes sidewalls that extend along an define opposing sides of the channel, and wherein the locking body includes an aperture through one of the sidewalls to form an open space at the one of the sidewalls at least partially along the channel and interconnecting with the passageway at the interface region, and wherein the open space is located at the locking body adjacent to the rolling shackle engaging element to prevent inward pressure on sides of the housing adjacent the rolling shackle engaging element from inhibiting movement of the rolling shackle engaging element along the ramp; and
wherein the locking body has opposing ends transverse to the sidewalls, wherein at least one of the opposing ends has a deformable feature comprising at least one of raised or depressed indicia and an outwardly extending flange for overlying the housing, and wherein the deformable feature on at least one of the opposing ends of the locking body is configured to deform upon a force applied to the locking body that tends to displace the locking body from the housing, thereby manifesting damage inflicted by the applied force to indicate tampering to the connection of the elongated shackle with the shackle engaging element.

15. The tamper evident security seal of claim 14, wherein the housing includes a frangible projection extending inward between the shackle passageway and the cavity, and wherein the frangible projection is configured to deform or fracture upon forcibly withdrawing the shackle end in a shackle withdrawal direction opposite the shackle insertion direction.

16. The tamper evident security seal of claim 15, wherein the frangible projection is arranged to contact and capture the rolling shackle engaging element at an end region of the channel as the rolling shackle engagement element moves up the ramp toward the locking position in response to the shackle being withdrawn from the housing.

17. The tamper evident security seal of claim 14, wherein the shackle engaging element is a ball arranged to frictionally engage the shackle.

18. The tamper evident security seal of claim 14, wherein the locking body has at least one end exposed to the ambient atmosphere adjacent to the housing body outer surfaces, the at least one end being arranged for being damaged to indicate tampering by an attempted forceful removal of the locking body from the cavity.

19. The tamper evident security seal of claim 14, wherein the rolling shackle engaging element is in the channel and has a diameter sufficiently small to pass through the shackle passageway; and an arrangement for capturing the element in the channel so the element can at most partially protrude into the passageway.

\* \* \* \* \*

UNITED STATES PATENT AND TRADEMARK OFFICE
CERTIFICATE OF CORRECTION

| | | |
|---|---|---|
| PATENT NO. | : 9,558,682 B2 | Page 1 of 1 |
| APPLICATION NO. | : 13/755017 | |
| DATED | : January 31, 2017 | |
| INVENTOR(S) | : Richard Dreisbach et al. | |

It is certified that error appears in the above-identified patent and that said Letters Patent is hereby corrected as shown below:

In the Specification

Column 6
Line 6, "an" should read --a--;

Column 9
Line 27, "0-3" should read --C-3--;

In the Claims

Column 16
Claim 14, Line 25, "an" should read --and--.

Signed and Sealed this
Sixth Day of February, 2018

Joseph Matal
*Performing the Functions and Duties of the*
*Under Secretary of Commerce for Intellectual Property and*
*Director of the United States Patent and Trademark Office*